Aug. 6, 1968     T. J. ROSEMA     3,395,786

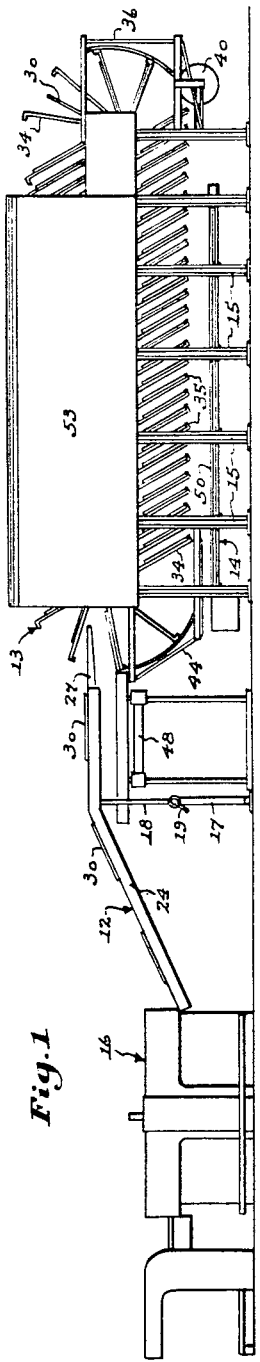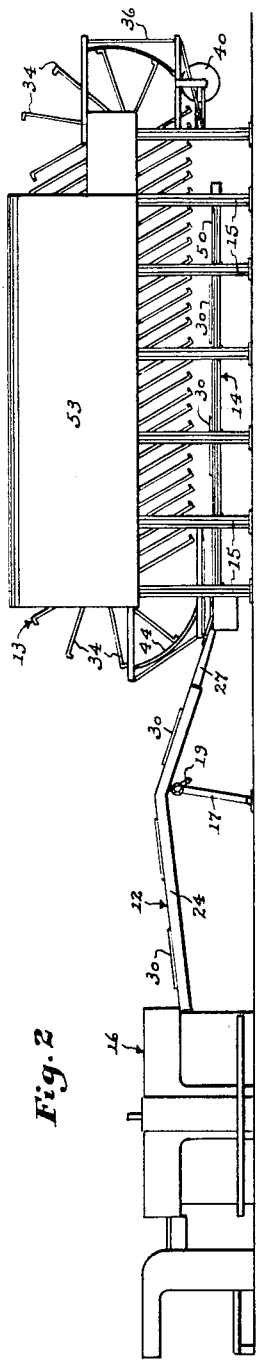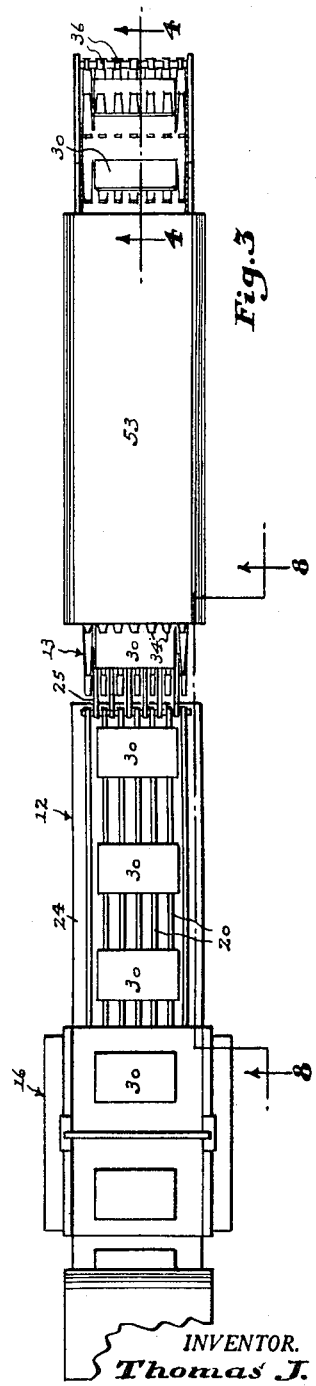

APPARATUS FOR DRYING COATED SHEET STOCK

Original Filed Jan. 23, 1964     3 Sheets-Sheet 2

INVENTOR

Thomas J. Rosema

BY *Price & Heneveld*

ATTORNEY

INVENTOR.
Thomas J. Rosema
BY Price & Heneveld
Attorney

United States Patent Office 3,395,786
Patented Aug. 6, 1968

3,395,786
APPARATUS FOR DRYING COATED
SHEET STOCK
Thomas J. Rosema, Grand Rapids, Mich., assignor to General Research, Inc., Grand Rapids, Mich., a corporation of Michigan
Original application Jan. 23, 1964, Ser. No. 339,788, now Patent No. 3,289,814, dated Dec. 6, 1966. Divided and this application July 22, 1966, Ser. No. 568,099
2 Claims. (Cl. 198—134)

ABSTRACT OF THE DISCLOSURE

A device for drying sheet stock which has been coated with either quick drying or slow drying coating material. It consists of an endless wicket conveyor whose upper portion is partially enclosed in a heating apparatus, an endless tape conveyor vertically displaced from the wicket conveyor and whose input station is vertically displaced from that of the wicket conveyor, and a shunt conveyor pivoted about a horizontal axis at the delivery end of a sheet coating machine such that its elevation can be adjusted to shunt coated sheet stock to either the wicket or belt conveyor.

The present invention relates to Apparatus for Drying Coated Sheet Stock, and more particularly to such apparatus adapted for association with a screen stencil printing machine for drying coated sheet stock coated thereby.

This application is a divisional of patent application Ser. No. 339,788, filed Jan. 23, 1964, entitled "Apparatus for Drying Coated Sheet Stock," now U.S. Patent No. 3,289,814.

The primary objects of the invention are to provide coated sheet drying apparatus which is especially well adapted for drying coated sheets delivered to the apparatus from a screen stencil machine; to provide apparatus for drying sheet stock which is coated with either quick-drying or slow-drying materials; to provide such drying apparatus which includes an endless wicket-type conveyor for drying sheets which are coated with slow-drying material, and in which the coated sheets are advanced from a receiving station across an upper reach of the wicket conveyor to a transfer station, and then returned across a lower reach of the conveyor to a delivery station; to provide means at the transfer station, where each sheet is transferred from its advance trip wicket carrier to the next preceding wicket carrier for the return trip, whereby the sheets are positively prevented from falling off the conveyor during the transfer; to provide similar means near the delivery station of the endless wicket conveyor for retaining the sheets on the conveyor; and in general to provide such coated sheet drying apparatus which is efficient and versatile in performance, and also compact and reasonably enonomical in construction.

An illustrative embodiment of the invention is shown in the accompanying drawings, wherein:

FIG. 1 is a side elevational view of the new coated sheet drying apparatus associated with a screen stencil printing machine shown somewhat diagrammatically at the left side of this view, the drying apparatus being here shown set up for drying sheet stock coated with slow-drying material on an endless wicket conveyor;

FIG. 2 is a side elevational view of the same but with the drying apparatus set up for drying sheet stock coated with fast-drying material on an endless tape conveyor;

FIG. 3 is a top plan view of the same;

Figure 4:
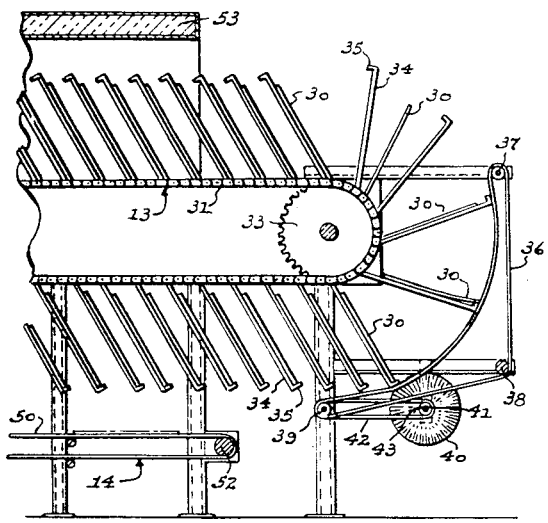
FIG. 4 is an enlarged, fragmentary, vertical sectional view of parts of the drying apparatus seen at the right side of FIGS. 1–3, the plane of section being indicated at lines 4—4 of FIGS. 3 and 6.
Figure 5:
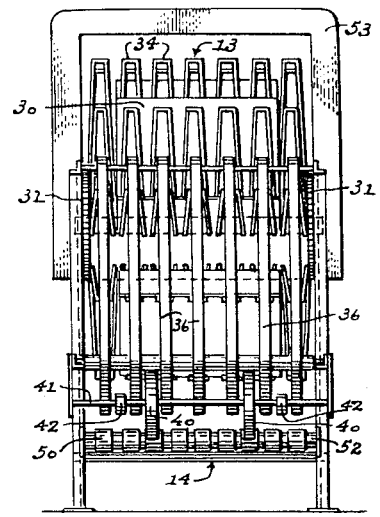
FIG. 5 is an end elevational view of the same.

Referring now in detail to these drawings wherein like parts are designated by the same numerals in the several views, the new coated sheet drying apparatus there shown comprises a system of three conveyors; an endless tape shunt conveyor generally designated 12; an upper, endless, wicket-type drying conveyor generally designated 13; and a lower, endless, tape drying conveyor generally designated 14. The upper and lower drying conveyors 13 and 14 are mounted on a framework comprising spaced upright posts 15 mounted by any suitable means on the floor.

The shunt conveyor 12, which is of downwardly opening obtuse angular form, has one end thereof—the left end as viewed in FIGURES 1–3, 8 and 9—mounted for pivotal movement about a horizontal axis at the delivery end of the screen stencil printing press generally designated 16. The shunt conveyor 12 is supported in the middle by a vertically adjustable standard comprising a lower tubular part 17 pivotally mounted on the floor, an upper part 18 telescoping with the lower part 17, and an operating crank 19 by means of which the standard's upper part 18 can be raised and lowered and the shunt conveyor thus be raised and lowered about its pivotal connection to the printing press 16. These parts are all shown more or less diagrammatically in FIGURES 1, 2 and 8. The shunt conveyor comprises horizontally spaced, endless conveyor tapes 20 which pass around rollers 21, 22 and 23 mounted on the conveyor's framework 24 (see FIGURES 8 and 9). Other endless tapes pass around the rollers 23 and rollers 26 mounted on the ends of horizontally spaced arms 27 at the delivery end of the shunt conveyor. Conventional means (not shown) are provided for driving the rollers and tapes so as to convey coated sheets 30 from the delivery end of the printing press to the receiving ends of the drying conveyors.

The upper, endless, wicket drying conveyor 13 comprises endless sprocket chains 31 which pass around sprocket wheels 32 at the receiving end of the wicket conveyor (see FIGURE 8) and around other sprocket wheels 33 at the opposite or transfer end of the wicket conveyor (see FIGURE 4). Outwardly projecting, wicket-type sheet carriers 34 are mounted on the sprocket chains 31. Conventional means (not shown) are provided for driving the sprocket wheels and chains so as to advance the sheet carriers 34 from the receiving station of this conveyor, seen in FIGURE 8, to the transfer station of the conveyor, seen in FIGURE 4, and to return the carriers 34 from the transfer station to the delivery station, also seen in FIGURE 8.

Each sheet carrier 34 comprises a plurality of horizontally spaced wire wickets and each wicket has a lip 35 on its outer end for supporting a coated sheet 30 thereon during the sheet's return travel on the lower reach of the conveyor. The sheet carriers 34 traverse the upper reach of the wicket conveyor in an upwardly and rearwardly extending position and traverse the lower reach of the conveyor in a downwardly and rearwardly extending position. At the transfer station seen in FIGURE 4 each stock sheet 30 falls from its advancing sheet carrier onto the next preceding carrier for its return trip.

Up to this point the description is of a more-or-less conventional wicket-type drying conveyor. In such a conventional conveyor, many of the coated sheets would fall off the conveyor at the transfer station and inasmuch as these sheets were not yet completely dry they were spoiled. In the present invention means are provided for positively maintaining the sheets on the conveyor at the transfer station. These means comprise a plurality of endless tapes 36 (see FIGURES 4–7) which pass around rollers 37, 38 and 39 mounted on the frame of the apparatus. These tapes are so mounted at the transfer station as to be engaged by the outer ends of the sheet carriers 34 and driven thereby so as to maintain the coated sheets on the conveyor during their fall from one carrier to the next preceding carrier.

Figure 7:
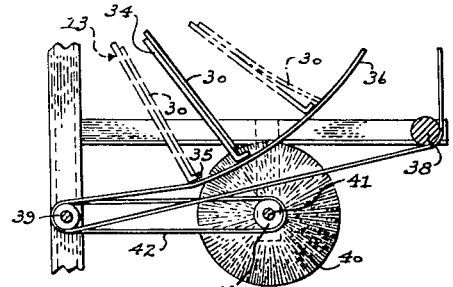
FIG. 7 is a further enlarged, fragmentary, vertical sectional view of parts of the machine seen at the lower right in FIG. 4.

Other means are provided at the transfer station for insuring that each coated sheet is correctly positioned on its return trip carrier and supported on said carrier's lip 35. These means comprise a pair of cylindrically formed brushes 40 mounted adjacent the endless tapes 36 for rotation about a horizontal axis. As shown, the brushes 40 are mounted on a shaft 41 which is driven by belts 42 passing around the roller 39 and around pulleys 43 on the shaft 41. The peripheries of the brushes 40 are adapted to contact the outer edge of each sheet so as to "kick" the sheet forwardly-upwardly onto the return carrier's lip 35. FIGURE 7 illustrates in broken lines a coated sheet 30 which in its fall from its advance trip carrier missed the return trip carrier's lip 35 but is still maintained on the conveyor by the tapes 36. In full lines in this view is illustrated the same sheet 30 after it has been kicked forwardly and upwardly beyond the lip 35, and in dotted lines the sheet is shown after it has come to rest with the carrier's lip 35 supporting it in correct position for the return trip.

Figure 8:
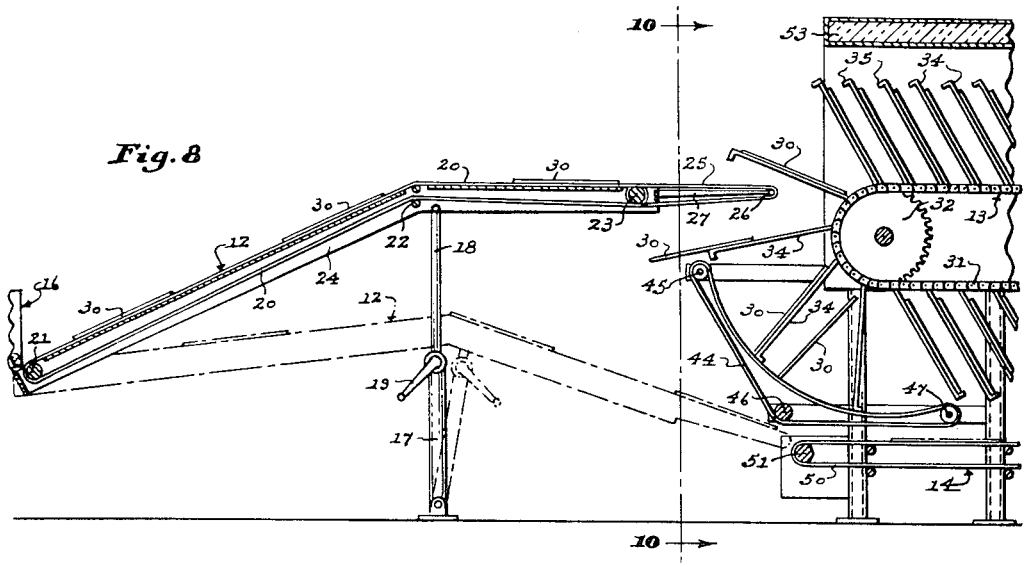
FIG. 8 is an enlarged, fragmentary, vertical sectional view of parts of the drying apparatus, the plane of section being indicated at lines 8—8 of FIGS. 3 and 9.
Figure 9:
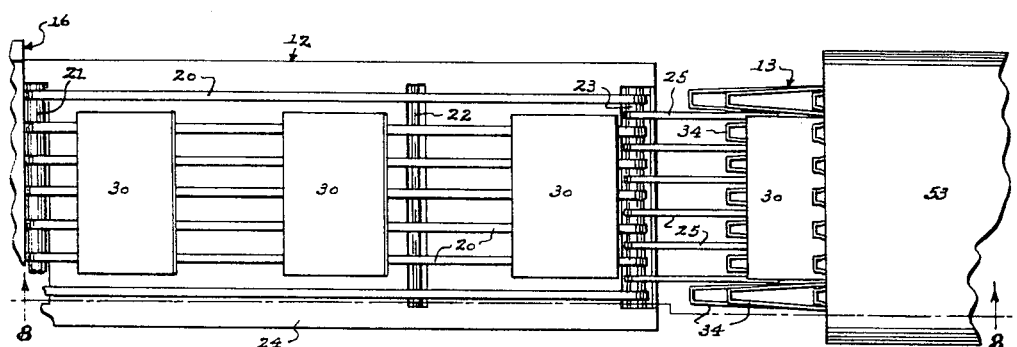
FIG. 9 is a top plan view of the same.
Figure 10:
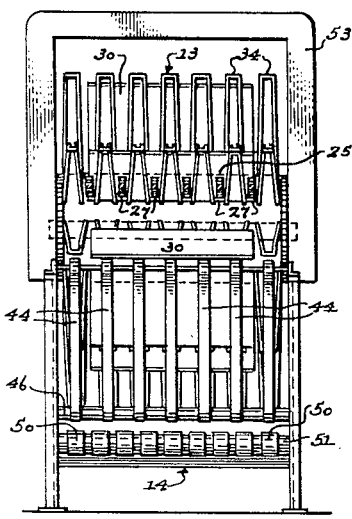
FIG. 10 is a vertical sectional view thereof taken on line 10—10 of FIG. 8.

Means similar to the tapes 36 are provided at the wicket conveyor's delivery station seen in FIGURES 1 and 8. As each sheet approaches the conveyor's delivery station it falls from its return trip carrier 34 onto the next succeeding carrier, during which fall the sheet is maintained on the conveyor by endless tapes 44 which pass around rollers 45, 46, and 47 and which tapes are driven by the outer ends of the carriers 34. As each sheet 30 passes upwardly beyond the endless tapes 44, it slides by gravity off its carrier and onto a suitable receiving pallet 48 (see FIGURE 1) which may desirably be of the type which automatically lowers as the pile of dried sheets thereon increases in depth.

The lower endless tape drying conveyor 14 is of more-or-less conventional type, and comprises spaced endless tapes 50 which pass around rollers 51 and 52 mounted for rotation about horizontal axes, on the frame of the apparatus.

*Operation*

The new coated sheet drying apparatus is equipped for drying sheet stock which is coated with either quick-drying or slow-drying coating materials.

When drying sheets coated with quick-drying material, the shunt conveyor 12 is swung to its lowered position seen in full lines in FIGURE 8. Coated sheets 30 are conveyed by the shunt conveyor from the delivery end of the printing press 16 to the receiving end of the lower, endless tape drying conveyor 14 from which the sheets are delivered in dried condition onto a suitable pallet (not shown) at the left hand side of the machine as viewed in FIGURE 2.

Figure 6:
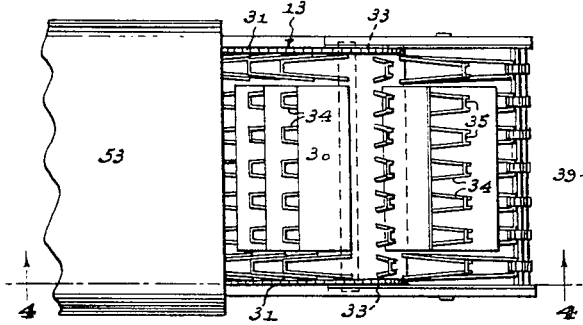
FIG. 6 is a top plan view of the same.

When drying sheets coated with slow-drying material, the shunt conveyor 12 is moved to its elevated position seen in full lines in FIGURES 1 and 6. The coated sheets 30 are then conveyed by the shunt conveyor to the upper endless wicket-type drying conveyor 13. The wire wickets of each sheet carrier 34 pass between the spaced arms 27 and conveyor tapes 25 of the shunt conveyor, picking up a coated sheet 30 and advancing it to the right as seen in the drawings across the upper reach of the conveyor. This upper reach of the wicket conveyor, as shown, passes through a heated enclosure 53. When each coated sheet 30 arrives at the transfer station seen in FIGURE 4, it falls from its advance trip carrier 34 onto the next preceding carrier for the return trip. During this transfer, the sheets are prevented from falling off the conveyor by the endless tapes 36 which are driven by the outer ends of the sheet carriers themselves. After the transfer of each sheet from one carrier to the next preceding carrier, the sheet is kicked forwardly and upwardly by the rotating brushes 40 to insure that it is in correct position resting on the carrier's lip 35 for the return trip across the lower reach of the conveyor.

As each sheet 30 approaches the delivery station of the wicket conveyor (see FIGURE 8) it falls from its return trip carrier 34 onto the next succeeding carrier 34. During this fall the sheets are prevented from falling off the conveyor by the endless tapes 44 which are likewise driven by the outer ends of the sheet carriers themselves. As the dried sheets 30 pass upwardly beyond the tapes 44, they slide by gravity off their carriers 34 and onto a suitable receiving pallet 48 as seen in FIGURE 1.

It will thus be seen that the invention provides a novel and efficient apparatus for drying sheet stock which is coated with either quick-drying or slow-drying coating material, and while but one specific embodiment of the invention has been herein shown and described, it will be understood that numerous details thereof may be altered or omitted without departing from the spirit of the invention as defined by the following claims.

I claim:

1. Coated sheet drying apparatus for use in association with a sheet coating machine whereby sheets may be coated with either quick-drying or slow-drying coating materials, said apparatus comprising: an endless tape conveyor for drying sheets requiring a relatively short drying period; an endless wicket conveyor for drying sheets requiring a relatively long drying period mounted in vertical juxtaposition, said endless wicket conveyor having an input station and a discharge station immediately below said input station, said discharge station having means for accepting and stacking the coated sheets subsequent to their circulation around said endless wicket conveyor, said means including a removable pallet support table; an endless tape means at the discharge station extending for a distance under said wicket conveyor and upwardly therefrom so as to conform to a portion of the travel path of the ends of the wickets of said wicket conveyor to permit coated sheets to transfer from one wicket to another without allowing them to fall onto the endless tape conveyor, said endless tape conveyor having an input station vertically displaced from the input station of said endless wicket conveyor therefrom; each of said conveyors having a receiving end located vertically above or below each other and means for driving said conveyors in the same direction away from said receiving ends; and a shunt conveyor mounted for pivotal movement about a horizontal axis at the delivery end of the sheet coating machine and adapted to receive coated sheets from said machine and deliver them to the drying apparatus, said shunt conveyor being shiftable about said horizontal axis so that its delivery end can be elevated to deliver coated sheets to said endless wicket conveyor or lowered, after said pallet support table is removed, to deliver coated sheets to said endless tape conveyor.

2. Coated sheet drying apparatus according to claim 1 in which a heated enclosure is provided through which the upper reach of the endless wicket conveyor is at least partially enclosed and passes through.

References Cited
UNITED STATES PATENTS

| | | | |
|---|---|---|---|
| 959,996 | 5/1910 | Cole | 198—20 |
| 2,002,720 | 5/1935 | Smith | 198—134 |
| 2,883,033 | 4/1959 | Armstrong | 198—76 |
| 3,029,927 | 4/1962 | Farwell | 198—134 |

RICHARD E. AEGERTER, *Primary Examiner.*